(12) United States Patent
Treise

(10) Patent No.: US 11,014,752 B2
(45) Date of Patent: May 25, 2021

(54) ENDLESS CONVEYOR DEVICE HAVING REMOVABLE CONVEYOR UNIT AND METHOD

(71) Applicant: MULTIVAC MARKING & INSPECTION GMBH & CO. KG, Enger (DE)

(72) Inventor: Arthur Treise, Herford (DE)

(73) Assignee: MULTIVAC MARKING & INSPECTION GMBH & CO. KG, Enger (DE)

( * ) Notice: Subject to any disclaimer, the term of this patent is extended or adjusted under 35 U.S.C. 154(b) by 0 days.

(21) Appl. No.: 16/720,415

(22) Filed: Dec. 19, 2019

(65) Prior Publication Data

US 2020/0198896 A1 Jun. 25, 2020

(30) Foreign Application Priority Data

Dec. 20, 2018 (DE) .......................... 102018222579.6

(51) Int. Cl.
*B65G 21/10* (2006.01)
*B65G 15/64* (2006.01)
(Continued)

(52) U.S. Cl.
CPC .............. *B65G 21/10* (2013.01); *B65G 15/64* (2013.01); *B65G 21/06* (2013.01); *B65G 23/44* (2013.01); *B65G 2207/30* (2013.01)

(58) Field of Classification Search
CPC ........ B65G 21/10; B65G 21/06; B65G 15/64; B65G 15/28; B65G 23/22; B65G 23/24; B65G 23/44; B65G 41/002
See application file for complete search history.

(56) References Cited

U.S. PATENT DOCUMENTS 8,469,182 B2 6/2013 Alotto
9,457,487 B2 * 10/2016 Mayer ...................... B26D 7/32
(Continued)

FOREIGN PATENT DOCUMENTS

CN 104249915 A 12/2014
DE 10 2018 204 043 A1 9/2019
(Continued)

OTHER PUBLICATIONS

German Search Report dated Jun. 25, 2019, Application No. 10 2018 222 579.6, Applicant Multivac Marking & Inspection GmbH & Co KG.
(Continued)

*Primary Examiner* — William R Harp
(74) *Attorney, Agent, or Firm* — Brooks Kushman P.C.

(57) ABSTRACT

An endless conveyor device comprises a conveyor unit having at least one endless conveyor, which is configured to convey items; a drive roller assembly, which is drivable by a drive belt and configured to drive the endless conveyor and has a support element; a deflecting roller assembly and an intermediate body, disposed between the drive roller assembly and the deflecting roller assembly, as well as between a conveying strand and a return strand of the endless conveyor. The endless conveyor device further comprises a drive unit comprising the drive belt, a motor and a support device, which is configured to engage with the support element. The drive belt is relaxable by pivoting the conveyor unit relative to the drive unit about a rotation axis of the drive roller assembly in a first direction. A method for removing a conveyor unit from an endless conveyor device is also provided.

20 Claims, 6 Drawing Sheets

(51) Int. Cl.
*B65G 21/06* (2006.01)
*B65G 23/44* (2006.01)

(56) References Cited

U.S. PATENT DOCUMENTS

| | | | |
|---|---|---|---|
| 9,976,635 | B2 | 5/2018 | Edrich et al. |
| 2016/0167884 | A1 | 6/2016 | Batchelder et al. |
| 2017/0314652 | A1* | 11/2017 | Edrich ............... F16H 7/18 |

FOREIGN PATENT DOCUMENTS

| | | | |
|---|---|---|---|
| EP | 1 666 383 | A1 | 6/2006 |
| EP | 3 242 056 | A1 | 11/2017 |
| JP | S6327835 | U | 2/1988 |

OTHER PUBLICATIONS

European Search Report dated Apr. 28, 2020, Application No. 19215885.5-1017, Applicant Multivac Marking & Inspection GmbH & Co. KG, 9 Pages.

* cited by examiner

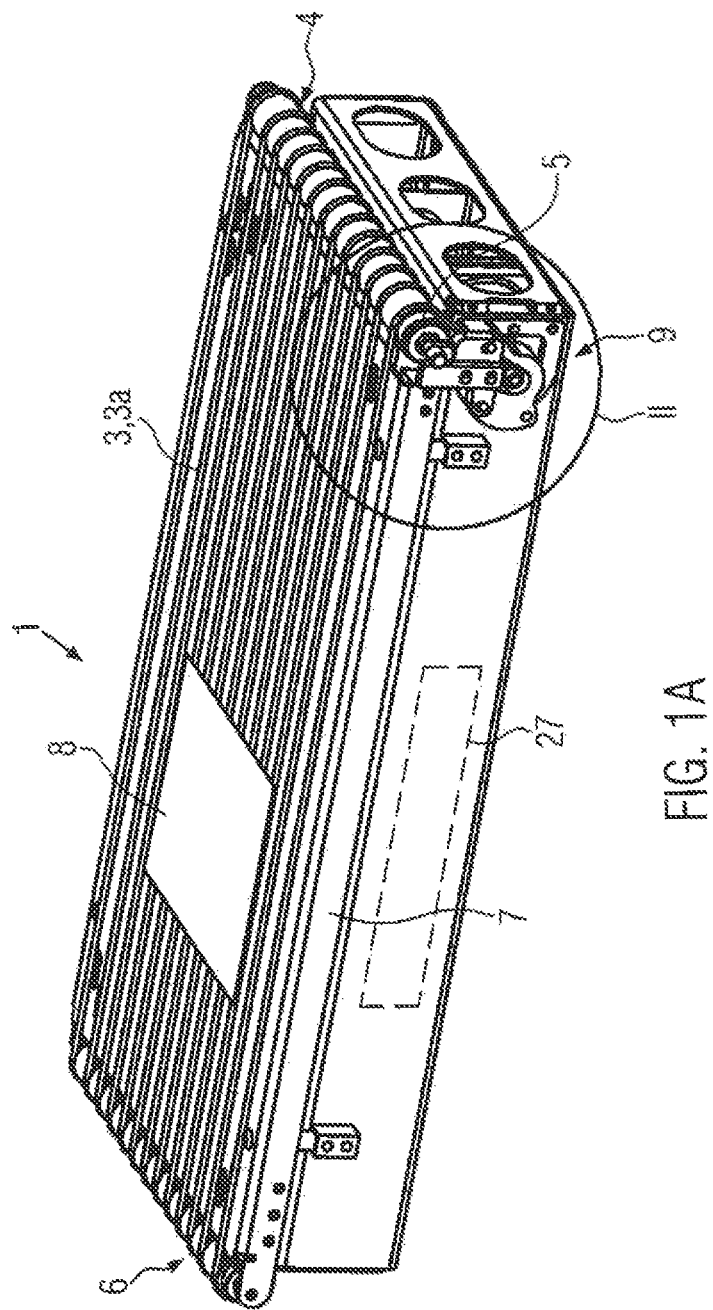

ENDLESS CONVEYOR DEVICE HAVING REMOVABLE CONVEYOR UNIT AND METHOD

CROSS-REFERENCE TO RELATED APPLICATIONS

This application claims foreign priority benefits under 35 U.S.C. § 119(a)-(d) to German patent application number DE 102018222579.6, filed Dec. 20, 2018, which is incorporated by reference in its entirety.

TECHNICAL FIELD

The disclosure is related to an endless conveyor device for conveying items, preferably food products, having a removable conveyor unit. The disclosure is also related to a method for removing a conveyor unit from an endless conveyor device.

BACKGROUND

Endless conveyor devices are known from practice for conveying items. In many cases they comprise for example a belt or several straps, which are mounted on a system of rollers and can convey items by circulating around these rollers. In DE 10 2018 204 043 A1 by the applicant, a transport device is described, which comprises a conveyor belt guided by a pivotable support. The tension of the conveyor belt may, therefore, be changed by pivoting the support between different positions in order to enable a stripping of the conveyor belt, for example for cleaning purposes.

Even though the relaxing of the conveyor belt already facilitates cleaning of conveyor devices, conveyor devices are known, in which cleaning is hampered by further components, for example drive units for the rollers of the conveyor device. Therefore, an object of the disclosure is to further facilitate cleaning of endless conveyor devices.

SUMMARY

The endless conveyor device according to the disclosure comprises a conveyor unit having at least one endless conveyor, which is configured to convey items, preferably food products, a drive roller assembly, which is drivable by a driving belt and configured to drive the endless conveyor, and a support element, a deflecting roller assembly and an intermediate body, which is disposed between the drive roller assembly and a deflecting roller assembly as well as between a conveying strand and a return strand of the endless conveyor. The endless conveyor device further comprises a drive unit, comprising the drive belt, a motor as well as a support device, which is configured to engage with the support element, wherein the drive belt is relaxable by pivoting the conveyor unit relative to the drive unit about a rotation axis of the drive roller assembly in a first direction. By relaxing the drive belt, a removal of the conveyor unit from the endless conveyor device is enabled. This may mean that the connection between the conveyor unit and the drive unit is separated completely.

For example, conveyor belts or conveyor straps may be regarded as endless conveyors according to the present disclosure. As the presently disclosed endless conveyor device may facilitate cleaning processes, it may in particular be configured to convey food products, which may incorporate special requirements, for example regarding the choice of materials.

Roller assemblies according to the present disclosure may be embodied as assemblies which, in addition to the respective roller, may also comprise axes, bearings as well as, if applicable, additional components, which enable or improve the rotational bearing of the respective roller. A drive roller assembly may additionally comprise a drive element, for example a gear or a pulley. Any structure of the drive roller assembly which is configured to accept bearing forces defining the geometric disposition of the drive roller assembly may be regarded as a support element. Any respective counterpiece provided on the drive unit with which the support element engages, may be regarded as a support device. Further specifications will be explained in more detail in the following.

It is beneficial if the support element has a cam. The cam may in particular be a structure extending eccentric to the rotation axis of the drive roller. This may mean that different portions of the cam have different distances to the rotation axis. During pivoting of the conveyor unit about the rotation axis of the drive roller the cam may pivot along and thereby facilitate the relaxing or tightening of the drive belt. The cam may represent a particularly simple construction of a support element. Thereby, in particular the weight of the conveyor unit and the endless conveyor device as a whole may be reduced. This may advantageously extend the range of applications of the endless conveyor device, for example an application as a belt weighing device may be enabled.

It is further beneficial if the support device has a first bearing surface configured to engage with the cam. For example, the cam may rest on the bearing surface. During the pivoting of the conveyor unit relative to the drive unit a distance between the rotation axis and the first bearing surface may be enlarged by the pivoting of the cam. In particular, the drive belt may be tightened thereby. A skilled person will recognize that during pivoting in the opposite direction, the distance may be reduced and the drive belt may thereby be relaxed.

In a preferred variant, the drive unit and or the conveyor unit may be connected to a magnet which magnetically pulls the conveyor unit in a second direction opposite the first direction. Thereby, inadvertent release of the conveyor unit from the drive unit may be prevented. In particular, the tension of the drive belt may thereby be maintained. The pulling of the conveyor unit in the first direction may here be affected by a magnet provided on the conveyor unit itself and attracts a surface of the drive unit. Alternatively or additionally, it is conceivable that a magnet fixed on the drive unit may attract a surface of the conveyor unit.

It is particularly beneficial, if the endless conveyor device further comprises a weighing device and is configured to determine a mass of the items being conveyed. This may enable a particularly advantageous application of the endless conveyor device as a weighing belt. In particular food product portions may be weighed efficiently by such a weighing belt.

In a further advantageous variant, the drive unit and/or the weighing device may have a first positioning element, which may be configured to engage with a second positioning element, the latter being provided on the intermediate body. This may facilitate inserting the conveyor unit into the endless conveyor device. In an application in connection with a weighing device it may further be ensured that the conveyor device is disposed at a defined position, such that the result of the weighing is not influenced by altered positioning. The first positioning element may be a protrusion. The second positioning element may be a recess or an opening. This configuration may be inverted as well.

The disclosure is also related to a method for removing a conveyor unit from an endless conveyor device, wherein the conveying unit has at least one endless conveyor, a drive roller assembly, a deflecting roller assembly and an intermediate body disposed between the drive roller assembly and the deflecting roller assembly. The method comprises the following steps: pivoting the conveyor device relative to a drive unit about a rotation axis of the drive roller assembly, whereby a drive belt engaging with the drive roller assembly is relaxed, moving the conveyor unit in a direction oriented parallel to the rotation axis whereby the drive belt is stripped from the drive roller assembly. The explanations regarding expressions recited above with respect to the endless conveyor device apply analogously to the method as well.

It is advantageous, if the pivoting of the conveyor unit comprises overcoming a holding force, which is preferably generated by a magnet. Thereby, an inadvertent releasing of the conveyor unit from the drive unit may be prevented. In particular, the tension of the drive belt may, thereby, be maintained.

It is particularly beneficial, if the relaxing of the drive belt during the pivoting is effected by a cam, which is preferably disposed on the drive roller assembly. The cam may represent a particularly simple construction of a support element. Thereby, in particular the weight of the conveyor unit and the endless conveyor device as a whole may be reduced. This may extend the range of applications of the endless conveyor device advantageously, for example an application as belt weighing device may be enabled.

The disclosure is related to an endless conveyor device as well as a method of the kind described above. An advantageous embodiment will be described in the following referring to figures.

BRIEF DESCRIPTION OF THE DRAWINGS

FIG. 1A shows a perspective view of an endless conveyor device in a configuration, in which the conveyor unit and the drive unit are positioned with respect to each other such that the drive belt is tightened;

DETAILED DESCRIPTION

Figure 1B:
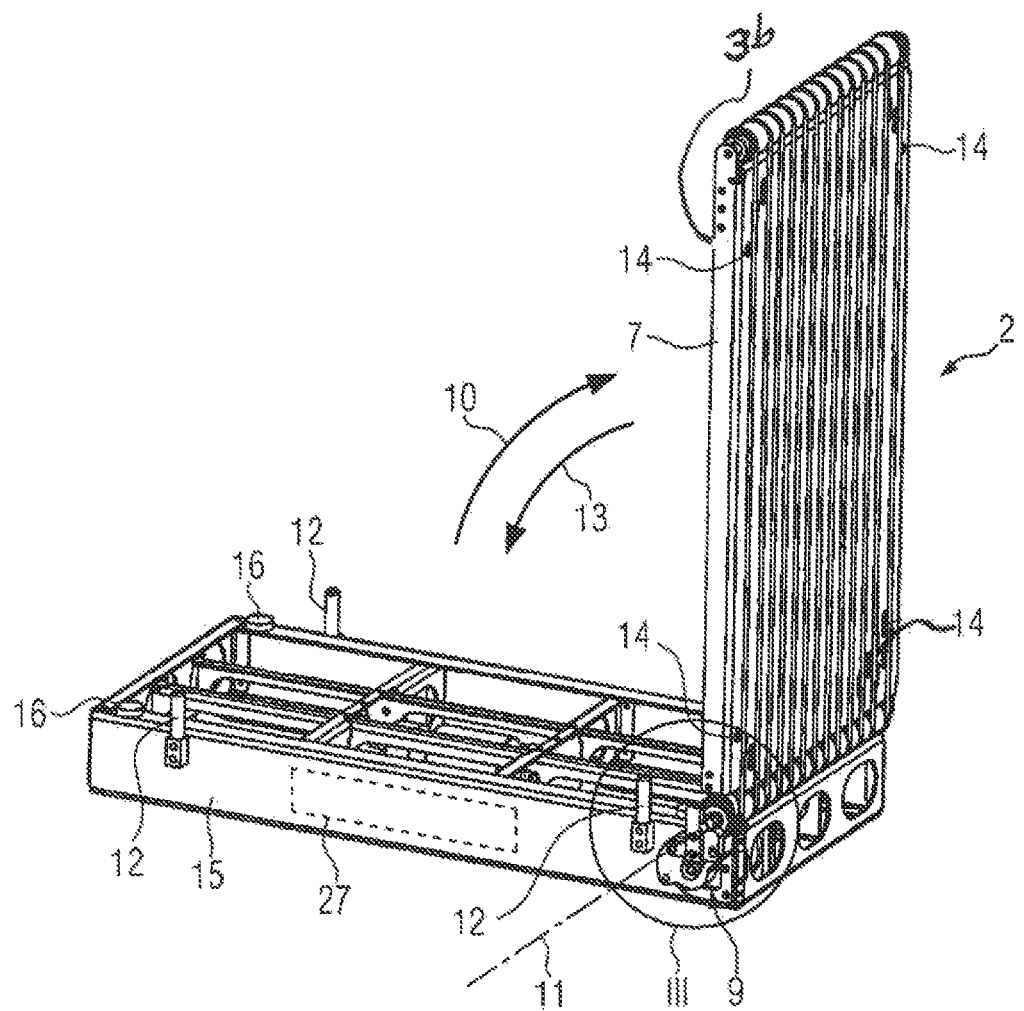
FIG. 1B shows a perspective view of an endless conveyor device in a configuration, in which the conveyor unit and the drive unit are positioned with respect to each other such that the drive belt is relaxed.

In FIG. 1A, a perspective view of an endless conveyor device 1 is illustrated. The latter may comprise a conveyor unit 2 (see FIG. 1B), and the conveyor unit 2 may contain an endless conveyor 3. In the present embodiment, several endless conveyors 3 are provided in the form of conveyor straps. As already mentioned, a single endless conveyor 3, for example in the form of a conveyor belt, is conceivable as well.

The conveyor unit 2 may further contain a drive roller assembly 4. The drive roller assembly 4 may be configured to drive the one or more endless conveyors 3. In addition, the drive roller assembly 4 may be drivable by a drive belt 5. The conveyor unit 2 may further comprise a deflecting roller assembly 6. The deflecting roller assembly 6 may be disposed at a portion of the conveyor unit 2 opposite to the drive roller assembly 4.

The conveyor unit 2 may further comprise an intermediate body 7. The latter may, as in the present embodiment, be disposed between the drive roller assembly 4 and the deflecting roller assembly 6. A conveyor strand 3a of the endless conveyor 3 may extend on a side of the intermediate body 7 facing the item 8. A return strand 3b may extend on a side of the intermediate body 7 facing away from the item 8. In other words, the intermediate body 7 may be disposed between the conveyor strand 3a and the return strand 3b.

The endless conveyor device 1 may further comprise a drive unit 9. The drive unit 9 may comprise the drive belt 5 and a motor (not shown). The drive unit 9 and in particular the drive belt 5 and the motor may cooperate to drive the drive roller assembly 4. In addition, the endless conveyor device 1 may have a weighing device 27.

In FIG. 1B, the endless conveyor device is illustrated in an opened state. The conveyor unit 2 has been pivoted in a first direction 10 about a rotation axis 11 of the drive roller assembly 4. FIG. 1B shows that the endless conveyor device 1 may comprise a positioning element 12. In the present embodiment, four positioning elements 12 are provided, of which only three are visible in FIG. 1B. If the conveyor unit 2 is pivoted in a second direction 13, which may be opposite to the first direction 10, the first positioning elements 12 may engage with the second positioning elements 14, which may be provided on the conveyor unit 2, in particular on the intermediate body 7. The skilled person will recognize, that the number of second positioning elements 14 may correspond to the number of first positioning elements 12. Therefore, instead of the 4 second positioning elements illustrated in the embodiment, only one second positioning element 14 or several, in particular two, three or five second positioning elements 14, may be provided.

The first positioning elements 12 may be connected to the drive unit 9. This may for example be effected by a support 15. In a similar way, the drive unit 9 may be connected to one or several magnets 16. The connection between the drive unit 9 and the magnets 16 may be embodied in the form of the support 15 as well. As illustrated in the present embodiment, the magnets 16 may be configured to pull the conveyor unit 2, and in particular the intermediate body 7, in the second direction 13.

Figure 2A:
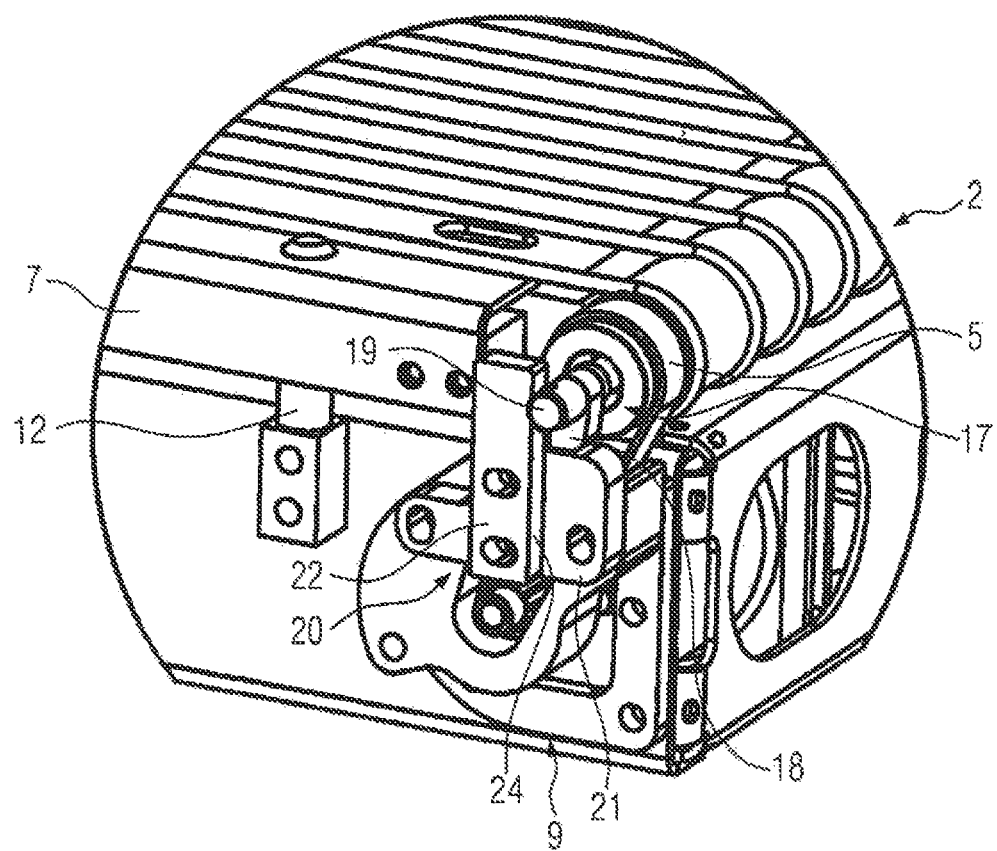
FIG. 2A shows an enlarged view of the area indicated at II in FIG. 1A.

In FIG. 2A, the area indicated at II in FIG. 1A is enlarged. In particular, the components of the drive unit 9 and the conveyor unit 2 are better recognizable. As in the present embodiment, the drive roller assembly 4 may have a support element 17. The support element 17 may have a cam 18. The drive roller assembly 4, in particular the support element 17, may further have a shaft appendix 19.

Figure 2B:
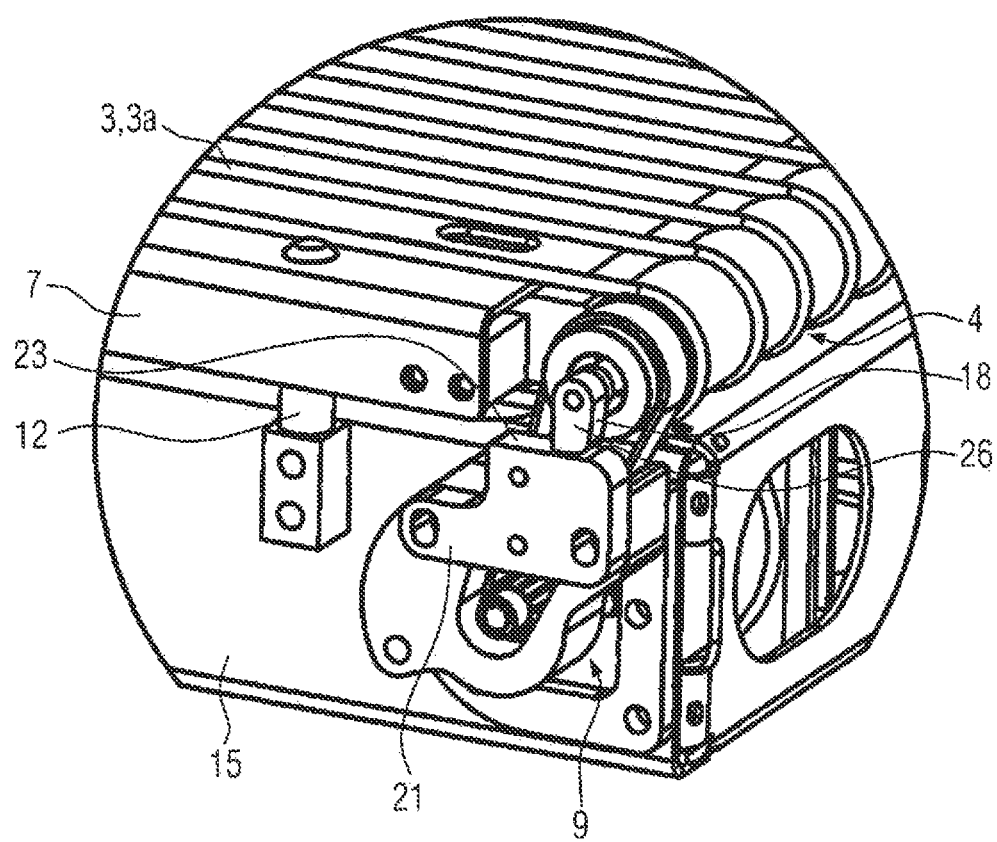
FIG. 2B shows the view of FIG. 2A, wherein some components are not shown for better visibility.

The drive unit 9 may contain a support device 20. The support device 20 may, as in the present embodiment, have a first stop 21 and preferably a second stop 22. The first and the second stops 21, 22 may be combined in a preferably integrally embodied part. As can be recognized in FIG. 2A, the support element 17 may be configured to engage with the support device 20. In particular, the cam 18 may be configured to engage with a first bearing surface 23 (see FIG. 2B), which may be provided on the first stop 21. The engagement between the support element 17 and the support device 20 may further comprise an engagement between the shaft appendix 19 and a second bearing surface 24, which may be provided on the second stop 22. In FIG. 2B, the engagement between the cam 18 and the first bearing surface 23 can be seen better, because the second stop 23 and the shaft appendix 19 are not shown. The shaft appendix 19 may be configured to accept bearing forces in a conveying direction of the endless conveyor 3, preferably by the engagement of the shaft appendix 19 with the support device 20, in particular with the second bearing surface 24. The cam 18 may be configured to accept bearing forces in a direction extending substantially orthogonal to the conveying direction of the endless conveyor 3, preferably by the engagement of the cam 18 with the support device 20, in particular with the first bearing surface 23.

Figure 3A:
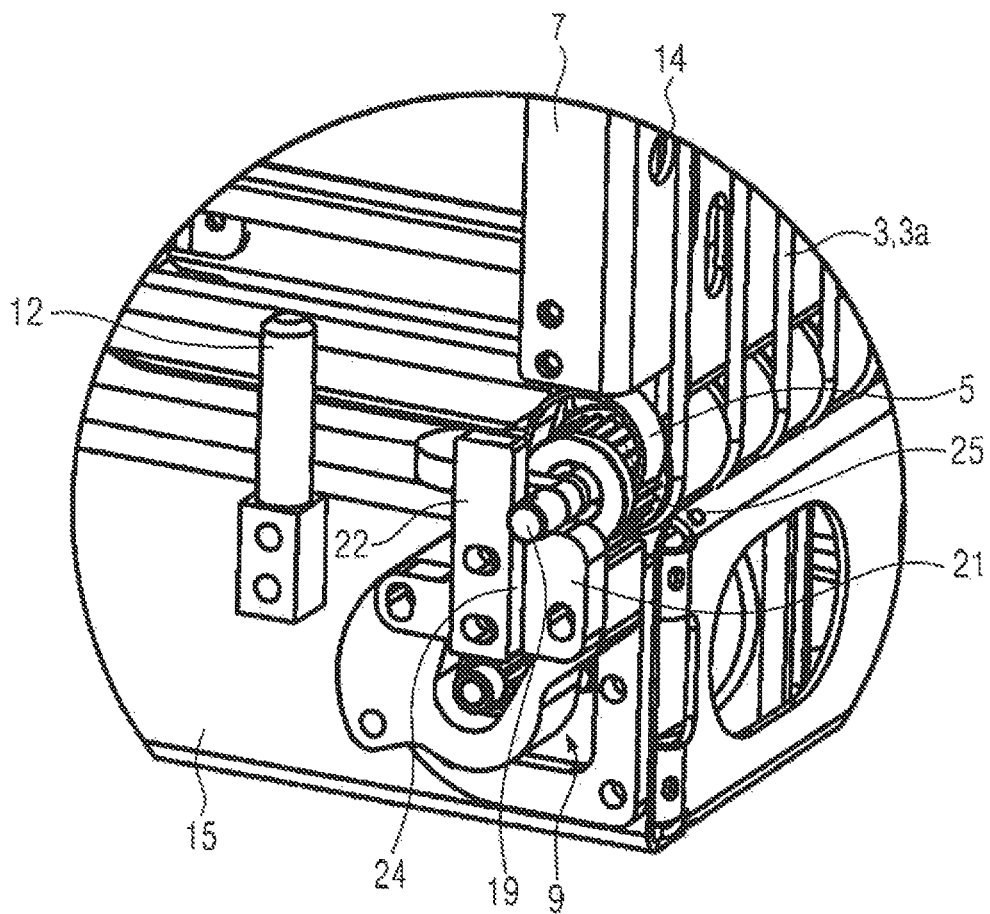
FIG. 3A shows an enlarged view of the area indicated at III in FIG. 1B.
Figure 3B:
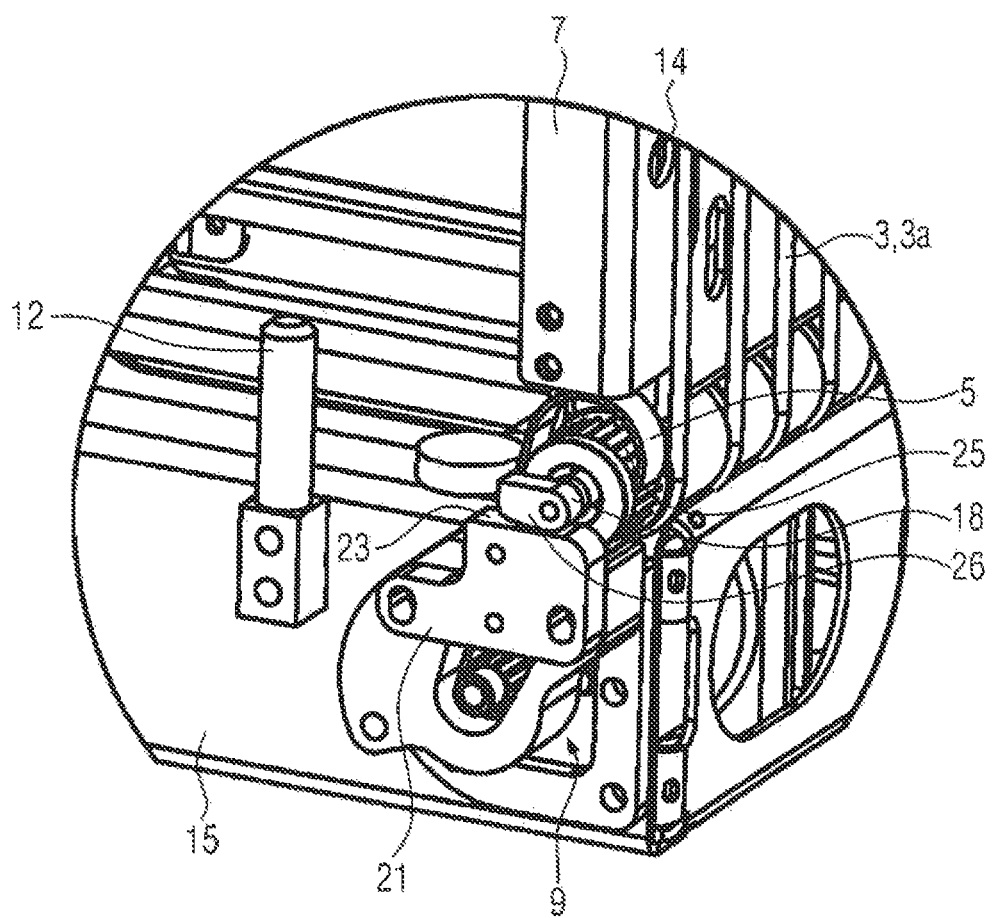
FIG. 3B shows the view of FIG. 3A, wherein some components are not shown for better visibility.

In FIGS. 3A and 3B, the area indicated at III in FIG. 1B is enlarged. Analogous to FIG. 2B, the shaft appendix 19 and the second stop 22 are not visible in FIG. 3B. In FIGS. 3A and 3B, it can be seen that the drive belt 5 has been relaxed by pivoting the conveyor unit 2 in the first direction 10. This may mean that a drive element 25 of the drive roller assembly 4, a gear in the present embodiment, is disengaged from the drive belt 5. In this state, the conveyor unit 2 may be moved in a direction extending parallel to the rotation axis 11 and thereby the drive belt 5 may be stripped from the drive roller assembly 4. During reinsertion of a previously removed conveyor unit 2, a front surface 26 of the support element 17 may engage with an axial bearing surface, which may be provided on the support device 20, in order to indicate that the conveyor unit 2 is in a suitable position to be pivoted in the first direction.

What is claimed is:
1. An endless conveyor device comprising:
a conveyor unit having:
an endless conveyor, which is configured to convey items;
a drive roller assembly, which is drivable by a drive belt and configured to drive the endless conveyor, the drive roller assembly including a support element, wherein the support element comprises a cam;
a deflecting roller assembly; and
an intermediate body disposed between the drive roller assembly and the deflecting roller assembly, as well as between a conveying strand and a return strand of the endless conveyor; and
a drive unit comprising the drive belt, a motor and a support device, which is configured to engage with the support element, wherein the drive belt is relaxable by pivoting the conveyor unit relative to the drive unit about a rotation axis of the drive roller assembly in a first direction.
2. The endless conveyor device according to claim 1, wherein the support device has a first bearing surface configured to engage with the cam.
3. The endless conveyor device according to claim 2, wherein the cam is configured to accept bearing forces in a direction extending substantially orthogonal to a conveying direction of the endless conveyor.
4. The endless conveyor device according to claim 2, wherein the support device has a second bearing surface configured to engage with the drive roller assembly.
5. The endless conveyor device according to claim 4, wherein the support element of the drive roller assembly is configured to engage with the second bearing surface to accept bearing forces in a conveying direction of the endless conveyor.

6. The conveyor device according to claim 5, wherein the support element comprises a shaft appendix that is configured to engage with the second bearing surface.
7. The endless conveyor device according to claim 1, wherein the drive unit and/or the conveyor unit are/is connected to a magnet, which is configured to magnetically pull the conveyor unit in a second direction opposite the first direction.
8. The endless conveyor device according to claim 1, wherein the endless conveyor device further comprises a weighing device configured to determine mass of the items conveyed.
9. The endless conveyor device according to claim 8, wherein the drive unit or the weighing device has a first positioning element, which is configured to engage with a second positioning element, the latter being provided on the intermediate body.
10. The endless conveyor device according to claim 1, wherein the drive unit has a first positioning element, which is configured to engage with a second positioning element provided on the conveyor unit.
11. A method for removing a conveyor unit from an endless conveyor device, wherein the conveyor unit has at least one endless conveyor, a drive roller assembly, a deflecting roller assembly and an intermediate body disposed between the drive roller assembly and the deflecting roller assembly, the method comprising:
pivoting the conveyor device relative to a drive unit about a rotation axis of the drive roller assembly, whereby a drive belt engaging with the drive roller assembly is relaxed; and
moving the conveyor unit in a direction oriented parallel to the rotation axis, whereby the drive belt is stripped off the drive roller assembly.
12. The method according to claim 11, wherein pivoting the conveyor device comprises overcoming a holding force.
13. The method according to claim 12, wherein the holding force is generated by a magnet.
14. The method according to claim 11, wherein the relaxing of the drive belt during the pivoting is effected by a cam.
15. The method according to claim 14, wherein the cam is disposed on the drive roller assembly.
16. An endless conveyor device comprising:
a conveyor unit having:
an endless conveyor, which is configured to convey items;
a drive roller assembly, which is drivable by a drive belt and configured to drive the endless conveyor, the drive roller assembly including a support element;
a deflecting roller assembly; and
an intermediate body disposed between the drive roller assembly and the deflecting roller assembly, as well as between a conveying strand and a return strand of the endless conveyor;
a drive unit comprising the drive belt, a motor and a support device, which is configured to engage with the support element, wherein the drive belt is relaxable by pivoting the conveyor unit relative to the drive unit about a rotation axis of the drive roller assembly in a first direction; and
a weighing device configured to determine mass of the items conveyed.
17. The endless conveyor device according to claim 16, wherein the support element is configured to engage a first bearing surface of the support device to accept bearing forces in a direction extending substantially orthogonal to a conveying direction of the endless conveyor, and the support element is configured to engage a second bearing surface of the support device to accept bearing forces in the conveying direction of the endless conveyor.

18. The endless conveyor according to claim 17, wherein the support element comprises a cam configured to engage the first bearing surface of the support device, and a shaft appendix configured to engage the second bearing surface of the support device.

19. The endless conveyor device according to claim 16, wherein the drive unit and/or the conveyor unit are/is connected to a magnet, which is configured to magnetically pull the conveyor unit in a second direction opposite the first direction.

20. The endless conveyor device according to claim 16, wherein the drive unit or the weighing device has a first positioning element, which is configured to engage with a second positioning element provided on the intermediate body.

* * * * *